May 21, 1968     G. O. TURNBULL ETAL     3,384,232
HARVESTING MACHINE OR COMBINE
Filed Dec. 13, 1965
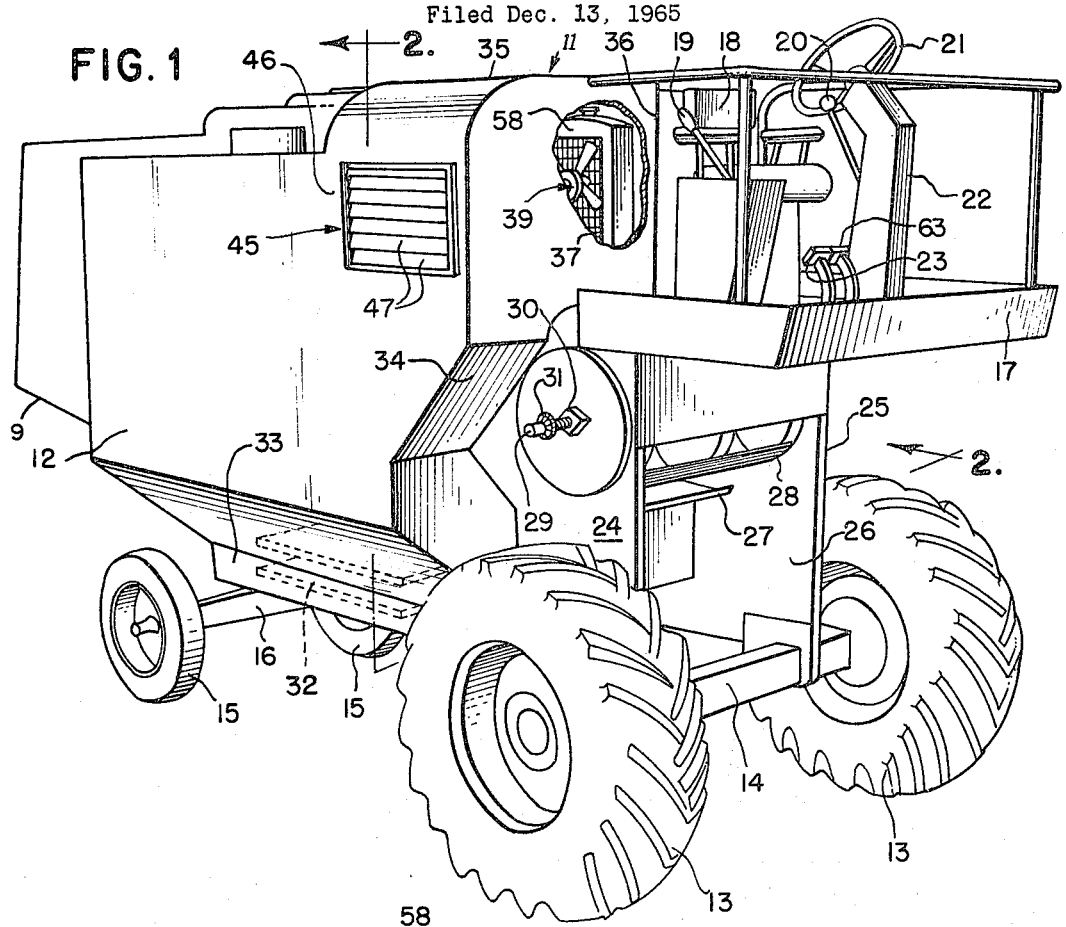
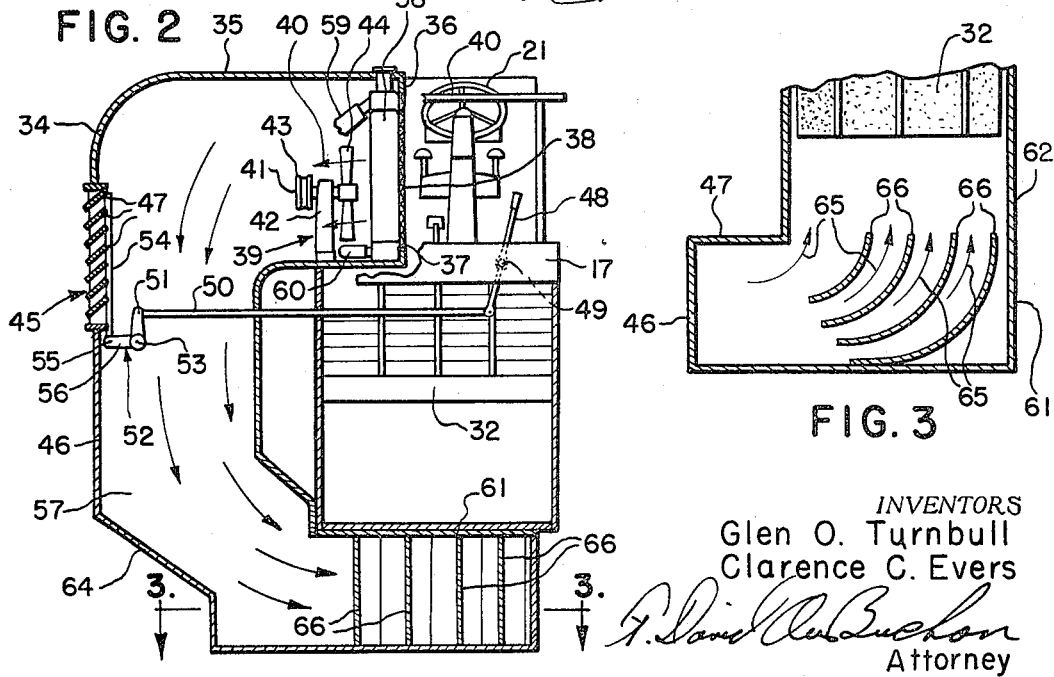
INVENTORS
Glen O. Turnbull
Clarence C. Evers
Attorney United States Patent Office 3,384,232
Patented May 21, 1968

3,384,232
HARVESTING MACHINE OR COMBINE
Glen O. Turnbull, Rock Island, Ill., and Clarence C. Evers, Davenport, Iowa, assignors to International Harvester Company, Chicago, Ill., a corporation of New Jersey
Filed Dec. 13, 1965, Ser. No. 513,441
5 Claims. (Cl. 209—11)

ABSTRACT OF THE DISCLOSURE

An air intake for the cleaning system of a harvesting machine having a plenum chamber located along the bottom of the harvesting machine, a vertical duct communicating with said plenum chamber, and fan means provided at the upper end of said vertical duct for creating an air stream that flows through the duct and into the plenum chamber. The air stream is discharged from the plenum chamber in a wide stream directed toward the harvester cleaning system.

---

The present invention relates to a combine harvesting machine and more particularly to an improved winnowing fan arrangement for use with such machine.

A grain harvesting machine or combine, conventionally employs an upwardly directed blast of air to clean harvested grain as the grain is passed over a porous sieve and screen assembly. The effect of the air is to lift chaff and other foreign materials from the grain and float it away.

The air current required for this operation is generated by a fan assembly which conventionally includes a fan having impeller vanes extending the width of the screen and sieve assembly which rotate about a horizontal axis within a cylindrical casing. The fan assembly discharges an air stream through a duct opening tangentially from the casing, and air is drawn into the fan through air intake openings in each end of the casing.

Since the cleaning air must be directed upwardly a winnowing fan assembly is conventionally mounted at the bottom of its combine relatively close to the ground. This places the fan in a region where the air is laden with flying chaff, dust, dirt and loose straw when the combine is in operation. As a result, the problem of how to prevent the fan assembly from sucking in large quantities of foreign material is present. This problem constantly heretofore has been in need of solution.

Many expedients have been adopted to keep the air intake of a combine winnowing fan clean. Screens and filters have been placed over the air intake passages but these tend rapidly to become choked with loose straw and chaff. Baffles have also been provided to define air inlet openings facing inwardly or outwardly and these openings have been screened. While all of the prior improvements and expedients have served to some degree to minimize choking of air intake openings eventually such air intake openings become clogged by reasons directly related to the proximity of the air intake openings to the ground.

It has also been proposed to extend air intake ducts upwardly from their fans and out of the reach of airborne material. While this may serve to minimize choking of air intake passages, it does not solve an attendant problem which is present in conventional combine harvesting machines and which arises by reason of the proximity of normal fan assembly casings to the ground. As a result of such disposition, there may be inadequate ground clearance of the bottoms of the fan assembly casings under normally encountered field conditions by reason of which damage might occur to fan assembly casings which could impair the rotatability of fan impeller vanes.

It is therefore the general object of the present invention to provide an improved winnowing fan arrangement for a combine which is effective to generate and maintain a clean uniform air flow across a screen and sieve assembly.

It is an additional object of the present invention to provide a novel winnowing fan arrangement having air intake openings located substantially above the ground out of the region of flying chaff and foreign material.

It is another object of the invention to provide a novel fan arrangement for a combine or harvesting machine and the like in which the casing for fan assembly impeller as well as the fan air intake openings are located substantially above ground level to the end that damage to the fan assembly casing caused by ground material is precluded.

A further object of the present invention is the inclusion in the novel fan arrangement of air duct means disposed in a manner such that the fan impeller draws cleaning air over the combine radiator whereby the air may be heated to serve to increase its grain drying characteristics.

It is also an object of the present invention to provide a winnowing fan assembly including an impeller for drawing air from an air intake opening through duct means having an air delivery opening and adapted to direct an air stream upwardly through a screen and sieve assembly with volume control means for governing the air stream passing through the duct.

Yet a further object of the present invention is to provide a winnowing fan assembly in which the plenum chamber and the fan assembly impeller are disposed in substantially spaced apart relationship at opposite portions of the assembly housing whereby the plenum chamber may be reduced in size as compared to a conventional plenum chamber and thereby permit greater ground clearance of the plenum chamber than has been possible heretofore.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of a self-propelled combined harvesting machine embodying the present invention in one form, parts being broken away for the purpose of illustration.

FIG. 2 is a vertical sectional view of the invention taken substantially on the line 2—2 of FIG. 1 and looking in the direction of the arrows.

FIG. 3 is a horizontal sectional view of the invention taken substantially along line 3—3 of FIG. 2 and looking in the direction of the arrows.

Referring now more particularly to the drawings, in FIG. 1 there is shown a harvesting device or combine generally designated 11 which is shown as being self-propelled. The illustrated combine is defined by a body 12 which is carried on a pair of forward traction wheels 13, 13 which are mounted on the opposite end portions of a forward axle assembly 14 and a pair of guiding steerable wheels, 15, 15 which are shown as being mounted on the opposite end portions of a rear axle or wheel supporting assembly 16.

The combine herein illustrated is controlled from an operator's platform 17 which is projected forwardly over one of the forward traction wheels from an upper forward end portion of said body 12. Said operator's platform carries a seat construction 18 defining a body support for an operator. From said seat construction, manually operable levers 19 and 20, as well as a steering wheel 21 which is mounted on top of a steering column 22 for control of wheels 15, 15, may be manipulated in a conventional manner. A pair of pedals 23 and 63 extend upwardly from the platform 17 adjacent the seat construction 18 and may provide means for foot control over various mechanisms not otherwise shown as they are not intended as limiting on the present invention.

The body 12 has a pair of opposite side panels or walls 24 and 25 which define a forward end opening 26 through which harvested grain is fed into the interior of said body for threshing. The body 12 is adapted to have connected to the forward end thereof by conventional means (not shown) a customary grain harvesting or procuring mechanism which can include a platform attachment the details of construction of which may be conventional and are well known in the art. Such grain procuring mechanism is omitted from the drawings as the same is not considered as limiting on the present invention.

The threshing means may include a concave 27 of conventional construction and a rasp bar cylinder 28 which is arranged for crop processing adjacent the entryway to the body 12 defined by the opening 26. A shaft 29 which is journalled in side walls 24 and 25 as shown at 30 defines the axis of rotation for the rasp bar cylinder 28 which is constrained for rotation with said shaft. Said shaft may be motivated by reason of operable connection to the combine prime mover means (not shown) the torque of which may be transmitted to a sprocket wheel 31 which is rigidly secured on said shaft 29.

Within the body 12, threshed grain is treated in a customary manner with a view to collecting clean grain free from chaff and other debris. To such end fractional portions of vegetation will be translocated from the threshing means across foraminous grain passing structures including a cleaning sieve and screen assembly 32 by any means which may be customary. While vegetation moves through the cleaning sieve and screen assembly a stream of air will be directed upwardly through such assembly for the purpose of blowing or floating chaff and other debris from the grain for ejection from the body 12 in a customary manner. Following general practice, the cleaning sieve and screen assembly is disposed in a lower portion 33 of the body 12 medially of the aft end of said body and said threshing means in grain receiving relationship with said last mentioned means as illustrated in FIG. 1. The air from the cleaning system is discharbed along with the straw and other debris through the straw discharge opening 9.

As illustrated in FIGS. 1 and 2, a portion of the body 12 comprises a sheet metal duct 34 defining what may be considered a vertical chamber 57 disposed forwardly from the cleaning sieve and screen assembly 32. Duct 34, which in the illustrated embodiment is disposed along one side of body 12, has an upper horizontal extension 35 which is shown as defining the upper limit of said body, said extension 35 being spaced substantially above the bottom of said body and the sieve and screen assembly 32 and terminating in a wall member or flange 36 which is disposed in a vertical plane adjacent the operator's position on the platform 17. The wall or flange 36 defines a vertical duct inlet or air intake opening 37 in which there is mounted a vertical screen or foraminated member 38 which serves as a filter through which air can be drawn into the duct 34.

For drawing air into the duct 34, a fan assembly 39 is disposed within the horizontal extension 35 of said duct in operative alignment with the screen 38 through which an air stream is drawn in the direction of arrows 40. In the illustrated embodiment, the shaft 41 of the fan assembly 39 may be journalled in a stand 42 which is suitably supported within the horizontal duct extension 35. A pulley wheel 43 may be rigidly secured to the shaft 41 by means (not shown) which will be evident to those skilled in the art. Said pulley wheel 43 may be operably connected to the combine prime mover means (not shown) for rotation of the plurality of radially disposed impeller members or blades 44 of said fan assembly. The attitude and curvature of the blades 44 is such that upon motivation of the shaft 41 air will be drawn through the air intake opening 37 and driven through duct 34. By thusly disposing the air intake opening of the fan assembly at a level adjacent the top of the body 12, access to air free from chaff and foreign material is procured whereby the likelihood of choking of air intake opening 37 during harvesting is substantially precluded.

A window opening 45 is provided in the upper end portion of the outer wall 46 of the duct 34 in near horizontial aligment with the air intake opening 37. A plurality of rockable louvers 47, only some of which have been numbered in FIG. 2, are disposed in the opening 45, said louvers shown as being disposed horizontally and pivotally mounted in said last mentioned opening. The louvers may be controlled from platform 17 by a manual louver control lever 48 which is disposed in a vertical plane and which is rockably mounted as at 49 horizontally to shift a transversely extending elongated link 50 to one end of which said lever is suitably connected. At its other end said link 50 is pivotally connected to one leg 51 of a bell crank 52 which is rockably mounted within duct 34 about a pivot 53. Upon alternate rocking of crank 52 by operation of lever 48, louvers 47 are correspondingly rocked about their axes of rotation by reason of a link 54 which is contrained for movement with said louvers 47, as illustrated in FIG. 2, to drive them in unison. The link 54 is operable as a result of pivotal connection thereof as at 55 to the leg 56 of said bell crank. Thereby, the volume of air passing into the vertical chamber section 57 of said duct 34 may be controlled from the operator's station to control the force of the air stream generated.

As illustrated in FIGS. 1 and 2, a combine radiator 58 which may serve as a heat exchanger for fluid to cool an internal combustion engine (not shown) is mounted adjacent the air intake opening 37 in the path of the drawn air stream 40. A customary coolant may be circulated by ordinary means through such combine engine and said radiator by cooling system means which include fluid conduits 59 and 60. As illustrated in FIG. 1, the radiator 58 may be of conventional construction having a plurality of openings or spaced apart heat exchange fins. The air stream which enters into the duct 34 through its air intake opening under action of the impeller blades 44 will be drawn across said radiator fins as a consequence of which such air can be heated. In terms of reference to the direction of the flow of air stream in the duct 34, it may be considered that said impeller blades are disposed behind or downstream of the radiator 58. The foregoing arrangement enables more efficient use of combines than has been possible using prior devices inasmuch as heated cleaning air stream which has been drawn across the fins of radiator 58 can function to dry grain through which said stream is blown during winnowing in a manner which hereafter will become apparent. Thereby, harvesting with combines employing the present invention may begin even while dew remains on crop and before it has been dried by the sun as the radiator heated air stream produced in accordance with the present invention will remove the moisture from that source.

The lower end portion of duct 34 is coextensive with a duct transition section 61 which extends in a plane which may be parallel to the duct extension 35. In the instant embodiment, said transition section 61 is disposed along the bottom of the body 12 to conduct cleaning air from duct 34 to a position for employment in winnowing by direction through the cleaning sieve and screen assembly 32. For that purpose the transition section 61 extends from duct 34 transversely of the body 12, crossing the panels 24 and 25, as illustrated in FIG. 2, whereby said transition section is disposed transversely of the fore-to-aft dimension of said screen and sieve assembly. Extending rearwardly from said transition section 61 is an integral and coextensive duct work portion which may be characterized as a plenum box 62. The plenum box may be rectangular in both horizontal and vertical cross section and preferably has elongated outlet slot or aperture means (not shown) which extends the width of the screen and sieve assembly 32 and opens therebeneath at an angle which is calculated to direct air currents from said plenum box 62 upwardly through said grain and sieve assembly for the purpose of winnowing.

Air stream guide means comprising a plurality of arcuate plates or baffles 66 are mounted in the transition section 61, said baffles being disposed vertically and extending in curved spaced apart paths. The disposition and arrangement of baffles 66 are such that an air stream which is impelled to the lower end portion 64 of the duct 34 will be bent for passage through the transition section 61 and then into the plenum box 62 and distributed substantially uniformly transversely in the plenum box 62, in the direction of the arrows 65, as illustrated in FIGS. 2 and 3. It is appreciated that the number, arrangement and design of the baffles 66 may be electively varied. However, all to the end that there can be produced winnowing air currents of substantially uniform force longitudinally of the plenum box outlet slot means.

By mounting the fan assembly 39 with impeller blades 44 disposed above the level of the screen and sieve assembly 32, the plenum box 62 may be of substantially smaller physical dimensions than plenum boxes conventionally employed with heretofore known winnowing fans. That is because in accordance with the present disclosure substantial management of the clean air stream occurs in the vertical ductwork prior to reaching the plenum box 62. Whereas in conventional arrangements, fan assemblies are disposed adjacent the foreward ends and at levels below those of screen and sieve assemblies giving rise to requirement for enlarged plenum boxes disposed immediately about respective impellers with such plenum boxes in proximity to the ground. Furthermore, by employing the teachings of the present invention the plenum box 62 need only have such portion thereof disposed below the level of screen and sieve assembly 32 which is required to provide outlet opening means of dimensions adequate to produce a sufficient winnowing air stream for the combine 11. Thereby, the magnitude of physical structure required to lower the body level of said combine may be minimized.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:
1. In a harvesting machine having an enclosed body supported by front and rear ground engaging wheels, a separating system including sieves for removal of chaff from grain within said enclosed body, a winnowing fan assembly for directing a stream of air upwardly through said cleaning system, said fan assembly including a plenum chamber mounted on the lower portion of said harvesting machine within said enclosed body and extending transverse thereto, said plenum chamber having a closed top, bottom, front and one side, the rear of said plenum chamber being open to form a discharge area, and the other side of said plenum chamber having an opening formed therein, a vertical duct supported by said harvesting machine on the side thereof corresponding to said other side of said plenum chamber, said vertical duct communicating at its lower end with said plneum chamber through said opening, an upper extension of said vertical duct, said upper extension having an air intake opening that substantially spans the distance across the extension and is vented to the atmosphere formed therein, and fan means adjacent said upper extension, said fan means operable to create an air stream flowing into said upper extension through the air intake opening, down said vertical duct into said plenum chamber and out said discharge area toward said separating system.

2. The invention as set forth in claim 1 wherein a heat exchanger is located within said upper duct extension such that the air entering through said air intake opening passes over said heat exchanger.

3. The invention as set forth in claim 1 wherein an adjustable louver mechanism is mounted in the wall of said vertical duct for controlling the volume of air directed to said plenum chamber.

4. The invention as set forth in claim 1 wherein baffle means are provided within said winnowing fan assembly for guiding the air stream from said vertical duct into said plenum chamber.

5. The invention as set forth in claim 3 wherein baffle means are provided within said winnowing fan assembly for guiding the air stream from said vertical duct into said plenum chamber.

References Cited
UNITED STATES PATENTS

| | | | |
|---|---|---|---|
| 372,016 | 10/1887 | Davis | 209—21 X |
| 1,025,730 | 3/1912 | Wolf | 209—139 |
| 1,262,760 | 4/1918 | Elliott | 56—19 |
| 1,662,431 | 3/1928 | MacGregor | 130—27.1 |
| 1,774,717 | 9/1930 | Lorenzen | 209—137 X |
| 2,702,631 | 2/1955 | Hamaker | 209—136 |
| 3,113,098 | 12/1963 | Ffoulkes | 209—238 X |
| 3,226,918 | 1/1966 | Jarvis | 56—20 |

FOREIGN PATENTS 841,967  5/1952  Germany.

HARRY B. THORNTON, *Primary Examiner.*

ROBERT HALPER, *Examiner.*